March 3, 1953        J. D. JOHNSON        2,630,356
BEARING AND SEAL ASSEMBLY
Filed July 24, 1947
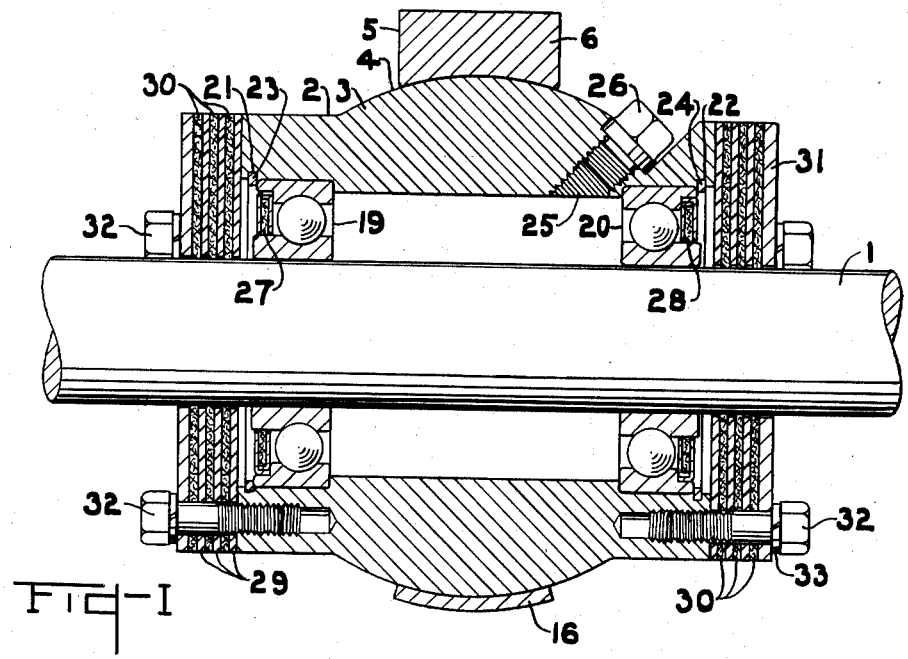
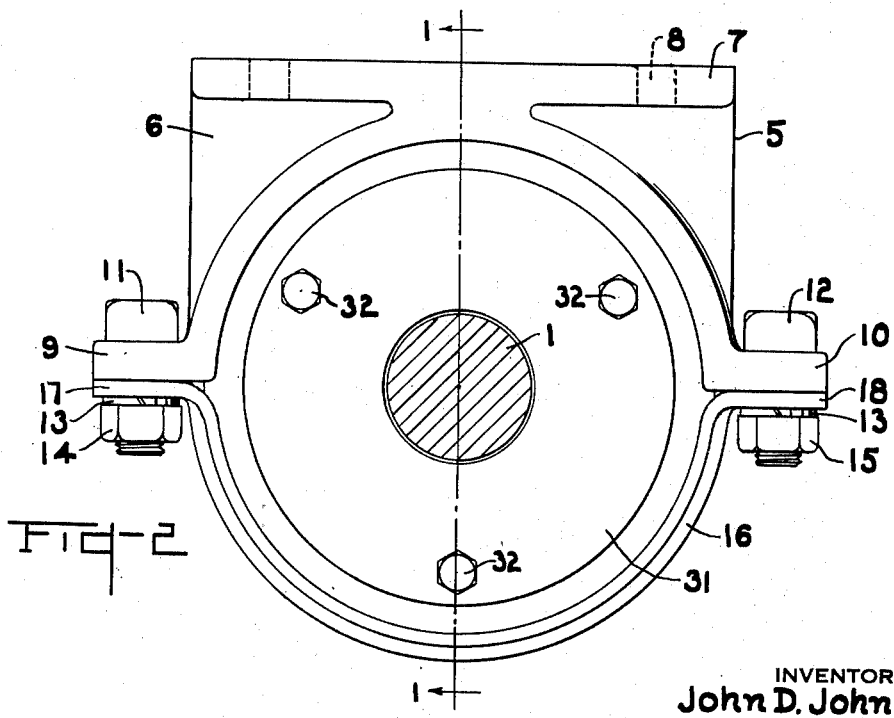
INVENTOR
John D. Johnson
BY Roy A. Plant
ATTORNEY Patented Mar. 3, 1953

2,630,356

UNITED STATES PATENT OFFICE 2,630,356

BEARING AND SEAL ASSEMBLY

John D. Johnson, Detroit, Mich.

Application July 24, 1947, Serial No. 763,267

9 Claims. (Cl. 308—187.1)

1

The present invention relates broadly to a bearing and mounting for same, and in its specific phases to a dust and waterproof self aligning bearing and mounting assembly.

A few self-aligning bearings have been proposed in the past, and while some of them have used a single felt washer at each end of the bearing, none of them have been of a construction thoroughly satisfactory as a bearing assembly having bearing surfaces running in lubricant and adapted for universal use under water, or in dusty air, or in corrosive atmospheres which are present in many chemical plants. It was a recognition of this problem and the need of a bearing of this type, as well as a knowledge of the shortcomings of the prior art, which led to the conception and development of the present invention.

Accordingly among the objects of the present invention is the provision of a dust and watertight self-aligning bearing assembly which will align itself, over a moderate angular range, with the shaft on which it is mounted, thus simplifying shaft mounting procedure, and at the same time, taking care of wobbling of the shaft under running conditions.

Another object is to provide a bearing assembly which uses a multiplicity of disc shaped sealing members at each end to make same positively dust proof and watertight.

Another object is to provide a multiplicity of alternating disc shaped packing, and disc shaped supporting washers, at each end of the bearing.

Another object is to provide an assembly which utilizes a bearing housing in which bearings, preferably of the anti-friction type, are mounted at each end with the disc shaped sealing members outside of same.

A further object is to provide a unitary construction self-aligning, firm holding, and quiet operating bearing assembly which has individual bearings at each end, each of said individual bearings preferably having an oil retainer at its outer face, there being means for filling the space between said bearings with grease or oil which is retained by the oil retainers, while any leakage beyond same is held by the disc shaped seals.

A further object is to provide an assembly which has individual bearings at each end, is filled with waterproof grease or oil, has suitable retainers for such grease or oil, and is adapted to be mounted for use while submerged under water such as an outer bearing for a motor boat propeller shaft.

A further object is to provide an improved and simplified construction dust and waterproof

2 bearing which is efficient in use and easy to mount in place on a length of shafting.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such means illustrating, however, but one of various ways in which the principle of the invention may be used.

In the annexed drawing:

Figure 1 shows a longitudinal center section of a preferred form of the present invention taken substantially at line 1—1 of Figure 2 looking in the direction of the arrows.

Figure 2 shows an end assembly view as seen from the left hand end of Figure 1.

Referring more particularly to the drawing, it will be noted that mounted on a conventional shaft 1, is the bearing assembly 2, which is illustrated in one preferred form. This bearing assembly has a housing 3, which is provided with a substantially central portion of its outer surface 4 spherically rounded. Housing 3, in turn, is mounted on a bracket 5, the inner surface of which is also spherically rounded to fit the wider spherically rounded portion 4 of housing 3. Bracket 5 has its body member 6 preferably in the form of a casting, which may be made from any suitable material such as semi-steel for ordinary use, or bronze, or Monel metal for use under water. The upper face of body member 6 is provided with a flange 7, which may be provided with openings 8 for use in suitably mounting and bolting the assembly in place at the point of use. Extending sidewise from the body member, as shown in Figure 2, are a pair of oppositely directed ears 9 and 10, which are conventionally drilled for the reception of bolts 11 and 12, which have lock washers 13, and respectively, nuts 14 and 15. A bearing cap 16, which is curved as shown to fit the wider spherically rounded portion of housing member 3, is also provided with ears 17 and 18, which are drilled in conventional manner to receive bolts 11 and 12. In order to facilitate alignment of the bearing in bracket 5, when the assembly is being mounted in place, and also to take care of freedom of movement required in case shaft 1 wobbles in use, it is preferable to coat the inner face of the bracket body member 6 and cap 16 with a suitable lubricant such as graphite, barium base waterproof grease, silicone grease, or the like, before final assembly and tightening of nuts 14 and 15, on the corresponding bolts 11 and 12.

Housing 3, which preferably has ends in the form of a continuous and symmetrical surface of revolution, as shown, is normally counterbored at each end for the reception of suitable bearings 19 and 20. While those bearings are diagrammatically shown and preferably of the ball bearing type, they may also be in the form of tapered roller bearings, spiral bearings, needle bearings, or plain sleeve bearings. To hold these bearings in place against the shoulder of the counterbore, the housing is provided with grooves 21 and 22, into which snap rings 23 and 24 are inserted. In order to provide adequate lubrication for the bearing, same may be provided with a drilled and threaded opening 25, adapted to be closed by means of a threaded plug 26. To facilitate holding the body of lubricant, which may be of any suitable type, for instance, barium base waterproof grease, silicone grease, SAE detergent or hypoid oil, it is preferable to provide the individual bearings themselves at their outer ends with suitable grease retainers 27 and 28, to pocket the lubricant and hold it directly in the bearing area.

Where the bearing is to be used, either submerged under water, or in a dusty, or corrosive gas atmosphere, the bearing must be protected against leakage of water, dust, or gases into the moving parts of the bearing itself. To accomplish this, a multiplicity of relatively rigid spacer washers 29, which may be formed from any suitable material such as hard fiber, nylon, plastic, mica, Monel metal, stainless steel, copper, bronze, or brass are used. Packing discs 30, made from any suitable material such as lead, or babbitt, or cloth, asbestos, hemp, paper, or coarse fiber material impregnated with graphite, oil, barium base grease, tallow, lard base grease, silicone grease, or the like, may be alternately placed between the spacer washers and extended into complete circular contact with shaft 1. At the outer end of these spacer washers and packing discs is placed a suitable plate 31, which is preferably made from steel, stainless steel, brass, bronze, or Monel metal. In order to hold the spacer washers, packing discs, and outer plate in place at each end of housing member 3, and to provide for tightening the seal of the packing on shaft 1, these parts are suitably drilled in alignment and the housing correspondingly drilled and threaded as shown in Figure 1 for the reception of several cap screws 32, under the head of each of which is placed a lock washer 33. This construction provides for initial sealing of the packing of the bearing assembly on the shaft with moderate tightening of studs 32. Wear at the shaft contacting edge of the packing can be compensated for, as required, by correspondingly tightening cap screws 32. After the packing has become badly worn it may be replaced in conventional manner.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. In a bearing assembly for a shaft, a housing, bearing means in said housing, multiple disc packing fitting around said shaft and in sealed contact therewith, multiple relatively rigid spacer washers, said washers alternating with said packing discs and having an internal opening slightly larger than said shaft, and variable pressure means for compressibly gripping all of said packing discs and all of said washers to said housing and forming a sealed joint therewith.

2. In a bearing assembly for a shaft, a housing, said housing being counterbored at both ends, bearings inside of said housing at each end thereof and fitting said counterbores, means for holding said bearings against endwise displacement, said bearings having an inside diameter closely fitting said shaft, multiple disc packing members fitting around said shaft at each end of said housing and in sealing contact with said shaft, multiple relatively rigid spacer washers, said washers alternating with said packing discs and having an internal opening slightly larger than said shaft, and variable pressure means for compressibly gripping all of said packing discs and all of said washers to said housing and forming a sealed joint therewith.

3. A self-aligning bearing for a round shaft, said bearing having a multiplicity of alternating packing discs and relatively rigid spacer washers at each end, said packing discs being adapted to form a fluid tight seal on said shaft, and variable pressure means for fluid tight fastening all of said packing discs and spacer washers compressibly on the ends of said bearing, concentrically of said shaft.

4. In a self-aligning bearing assembly for a round shaft, said bearing assembly having a housing which is bored larger than said shaft and counterbored at each end, said housing also having a concentric spherical outer periphery, and a supporting bracket spherically bored to fit said wider spherical outer periphery of said housing, the combination of individual bearings inside of said housing at the ends thereof and tightly fitting said counterbores, means for holding said bearings against endwise displacement, said bearings having an inside diameter closely fitting said shaft, a multiplicity of alternating packing discs and relatively rigid spacer washers at each end of said housing, said packing discs and spacer washers being concentric with said shaft with said packing discs forming a sealed joint therewith while said washers have an opening slightly larger than said shaft, and variable pressure means for fluid tight fastening all of said packing discs and spacer washers compressibly on the ends of said bearing housing.

5. A self-aligning bearing assembly as set forth in claim 4, wherein each of said individual bearings has a lubricant retainer on its outer face, and a filler opening in said housing with closing plug for use in placing lubricant in said housing between said individual bearings.

6. In a self-aligning bearing assembly having a housing which is bored larger than the shaft on which it is to be mounted and counterbored at each end, said housing also having a concentrically spherical outer periphery, a supporting bracket spherically bored to fit said wider spherical outer periphery of said housing, said bracket being in the form of a body member, and a bearing cap, each having cooperating ears with means for fastening same together at said ears, individual bearings inside of said housing at the ends thereof and tightly fitting said counterbores, and means for holding said bearings against endwise displacement, the combination of a multiplicity of alternating packing discs and relatively rigid spacer washers at each end of said housing, said multiplicity of packing discs and spacer washers starting with an inner spacer washer and ending with a relatively heavy rigid outer spacer washer, said packing discs and spacer washers being concentric with the shaft on which they are to be mounted, said packing discs forming a sealed joint with said shaft while said washers have an opening slightly larger than said shaft, and variable pressure means for fluid tight fastening all of said packing discs and all of said spacer washers compressibly on the ends of said bearing housing.

7. In a bearing assembly for a shaft, a housing having at least one end face in the form of a continuous and symmetrical surface of revolution, multiple disc packing fitting around said shaft and adapted to overlie said end face of said housing, and variable pressure means, part of which passes through said packing, for compressibly gripping all discs of said multiple disc packing to seal the end of said housing.

8. In a bearing assembly for a shaft, a housing having at least one end face in the form of a continuous and symmetrical surface of revolution, bearing means in said housing, multiple disc packing fitting around said shaft and adapted to overlie said end face of said housing, an outer plate in contact with the outer end of said multiple disc packing, and variable pressure means, part of which passes through said packing, for compressibly gripping all discs of said multiple disc packing between said outer plate and said housing and forming a sealed joint with the latter.

9. In a bearing assembly for a shaft, a housing having both end faces in the form of a continuous and symmetrical surface of revolution, said housing also having a portion of each end counterbored, bearings at each end of said housing and fitting said counterbores, said bearings also having an internal diameter closely fitting said shaft, multiple disc packing fitting around said shaft at each end of said housing and adapted to overlie said end faces thereof, an outer plate at each end of said housing and in contact with the outer end of said multiple disc packing, and variable pressure means at each end of said housing for compressibly gripping all discs of said multiple disc packing between said outer plate and the corresponding end of said housing.

JOHN D. JOHNSON.

REFERENCES CITED

The following references are of record in the file of this patent:

UNITED STATES PATENTS

| Number | Name | Date |
| --- | --- | --- |
| 665,569 | Little | Jan. 8, 1901 |
| 1,056,202 | Moore | Mar. 19, 1913 |
| 1,304,231 | Wilson | May 20, 1919 |
| 1,337,656 | Kasper | Apr. 20, 1920 |
| 1,696,938 | Curtis | Jan. 1, 1929 |
| 1,825,293 | Van Derhoef | Sept. 29, 1931 |
| 1,839,508 | Staege et al. | Jan. 5, 1932 |
| 1,844,552 | Bailey | Feb. 9, 1932 |
| 1,999,916 | Richardson | Apr. 30, 1935 |
| 2,054,581 | Crow | Sept. 15, 1936 |
| 2,374,960 | Russell | May 1, 1945 |
| 2,428,411 | Davis | Oct. 7, 1947 |